No. 725,917. PATENTED APR. 21, 1903.
W. B. BARBOUR & B. W. MEREDITH.
CLOTHES LINE PROP.
APPLICATION FILED JULY 5, 1902.
NO MODEL.
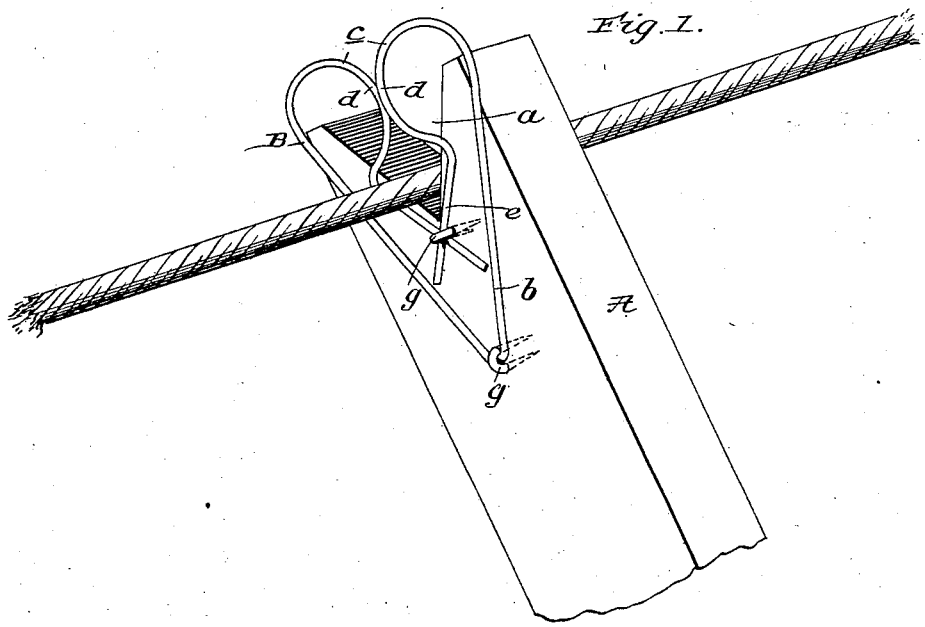
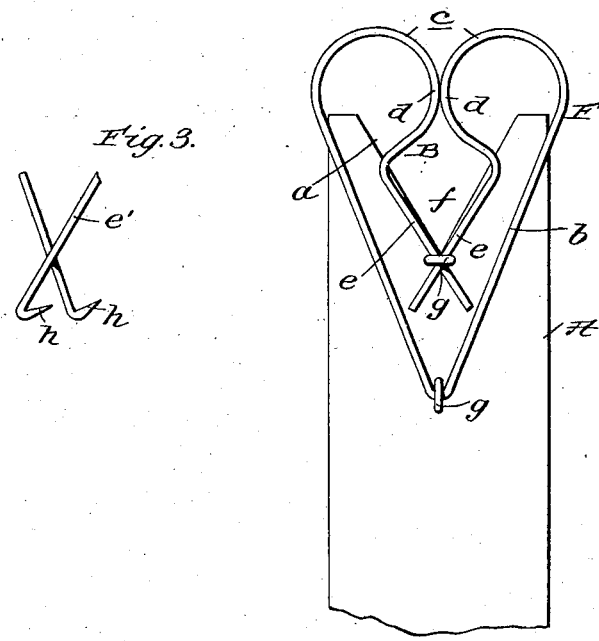
Witnesses
Inventors
W. B. Barbour &
B. W. Meredith.
By James Sheehy Attorney

UNITED STATES PATENT OFFICE.

WILLIAM B. BARBOUR AND BYRON W. MEREDITH, OF TRENTON, NEW JERSEY.

CLOTHES-LINE PROP.

SPECIFICATION forming part of Letters Patent No. 725,917, dated April 21, 1903.

Application filed July 5, 1902. Serial No. 114,417. (No model.)

*To all whom it may concern:*

Be it known that we, WILLIAM B. BARBOUR and BYRON W. MEREDITH, citizens of the United States, residing at Trenton, in the county of Mercer and State of New Jersey, have invented new and useful Improvements in Clothes-Line Props, of which the following is a specification.

Our invention relates to improvements in clothes-line props; and it consists in a certain peculiar construction the novelty, utility, and practical advantages of which will be fully understood from the following description and claims when taken in conjunction with the accompanying drawings, in which—

Figure 1 is a perspective view of the upper portion of our improved prop as it appears when in use; Fig. 2, a front elevation of the upper portion of the prop, and Fig. 3 a detail perspective view illustrating a modified construction.

Referring by letter to the said drawings, and more particularly to Figs. 1 and 2 thereof, A is the pole of the improved prop, which is preferably of wood and is provided in its upper end with a transverse and preferably V-shaped notch $a$, designed to seat a clothes-line after the manner shown in Fig. 1, and B is a clothes-line holder, the purpose of which is to prevent the pole from falling out of engagement with the line. The said holder is preferably made of a single piece of resilient wire and comprises a body-loop $b$, preferably V-shaped, as shown, curvilinear jaws $c$, having inner portions $d$, arranged to normally rest close together, and oblique arms $e$, which depend from the lower inner portions of the jaws $c$ and are crossed, as illustrated. The said arms $e$, in conjunction with the lower inner portions of the jaws $c$, form a space $f$, which when the holder is properly applied to the pole is adapted to receive the clothes-line, as shown.

The clothes-line holder is arranged on the side of the pole in the position best shown in Fig. 2—*i. e.*, so that the point of intersection of the arms $e$ is adjacent to the bottom of the notch $a$—and it is fastened to the pole through the medium of two staples $g$, one of which straddles the arms $e$ at their point of intersection, while the other straddles the bight of the loop-shaped body $b$.

With the holder B applied to the pole A in the manner shown and described it will be observed that when the prop is raised into engagement with a clothes-line the jaws $c$ will give outwardly and permit the line to pass downwardly between their inner portions $d$ and into the space $f$; also, that when the line has passed down between the jaws and into the space $f$ the said jaws will spring together, and thereby effectually prevent the prop from becoming casually disconnected from the line and falling. It will further be observed that when the prop is in engagement with a clothes-line, as shown in Fig. 1, the line rests in the bottom of the notch $a$ in the pole and does not bear on or subject the holder to pressure or strain.

When desired, the holder may be provided, in lieu of the arms $e$, with arms $e'$, Fig. 3, which terminate in barbs or prongs $h$, designed to be driven into the pole A, with a view of strengthening the connection of the holder thereto.

It will be appreciated from the foregoing that the clothes-line holder B, notwithstanding its efficiency, is extremely simple and inexpensive; also, that the holder is adapted to be placed on the market as an article of manufacture and readily fastened by the user to ordinary clothes-line poles such as at present in use.

We have entered into a detailed description of the construction constituting the present and preferred embodiment of our invention in order to impart a full, clear, and exact understanding of the same. We do not desire, however, to be understood as confining ourselves to such specific construction, as such changes or modifications may be made in practice as fairly fall within the scope of our claims.

Having described our invention, what we claim, and desire to secure by Letters Patent, is—

1. In a clothes-line prop, a pole having a notch in its upper end, and a clothes-line holder formed of a single piece of spring metal, and comprising the loop-shaped body, the curvilinear jaws having inner portions arranged to normally rest close together, and oblique, crossed arms depending from the inner lower portions of the jaws; the said holder being fastened on the side of the pole so that the point of intersection of its oblique arms rests adjacent to the bottom of the notch in the pole.

2. In a clothes-line prop, a pole having a V-shaped notch in its upper end, the clothes-line holder formed of a single piece of wire, and comprising the V-shaped body, the curvilinear jaws having inner portions arranged to normally rest close together, and oblique, crossed arms depending from the inner lower portions of the jaws; said holder being arranged on the side of the pole so that the point of intersection of its oblique arms rests adjacent to the apex of the V-shaped notch in the pole, and staples straddling the bight of the V-shaped body and the point of intersection of the oblique arms, respectively, of the holder, and fastening said holder to the pole.

In testimony whereof we have hereunto set our hands in presence of two subscribing witnesses.

WILLIAM B. BARBOUR.
BYRON W. MEREDITH.

Witnesses:
JOHN KRUMHOLZ,
DAVID BARBOUR.